US008955955B2

(12) United States Patent
Mimura et al.

(10) Patent No.: US 8,955,955 B2
(45) Date of Patent: Feb. 17, 2015

(54) IMAGE RECORDING METHOD

(75) Inventors: Tomomi Mimura, Kawasaki (JP); Takeshi Okada, Zushi (JP); Akihiro Taya, Yokohama (JP); Masanobu Ootsuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 429 days.

(21) Appl. No.: 13/489,344

(22) Filed: Jun. 5, 2012

(65) Prior Publication Data

US 2012/0313998 A1 Dec. 13, 2012

(30) Foreign Application Priority Data

Jun. 9, 2011 (JP) ................................ 2011-129159

(51) Int. Cl.
*C09D 11/00* (2014.01)
*B41M 5/00* (2006.01)
*B41J 2/21* (2006.01)

(52) U.S. Cl.
CPC ............ *B41M 5/0023* (2013.01); *B41J 2/2114* (2013.01)
USPC .......................................................... 347/100

(58) Field of Classification Search
CPC ............................ B41J 2/2114; B41M 5/0023
USPC .......................................................... 347/100
See application file for complete search history.

(56) References Cited

U.S. PATENT DOCUMENTS

| | | | | |
|---|---|---|---|---|
| 6,290,315 | B1 * | 9/2001 | Sayama | 347/10 |
| 6,547,354 | B1 * | 4/2003 | Askeland et al. | 347/12 |
| 2006/0001698 | A1 * | 1/2006 | Hart et al. | 347/40 |
| 2009/0174741 | A1 * | 7/2009 | Nagata et al. | 347/12 |
| 2011/0115840 | A1 * | 5/2011 | Hoshiyama et al. | 347/10 |

FOREIGN PATENT DOCUMENTS

JP 2001-39006 A 2/2001

* cited by examiner

*Primary Examiner* — Laura Martin

(74) *Attorney, Agent, or Firm* — Canon U.S.A. Inc., IP Division

(57) ABSTRACT

An image recording method has a feature such that a first ink, a second ink, and a third ink satisfy both the following relationships (1) and (2): (1) the film thickness of dots of the inks formed when one drop of each ink is applied to the recording medium is as follows: First ink>Second ink>Third ink; and (2) the penetration time of the clear ink when applying the inks to the recording medium, and then further applying one drop of the clear ink to the region to which each ink is applied is as follows: First ink≥Second ink≥Third ink.

2 Claims, No Drawings

IMAGE RECORDING METHOD

BACKGROUND OF THE INVENTION

1. Field of the Invention

The present invention relates to an image recording method.

2. Description of the Related Art

It is known that an ink containing a pigment as a color material (hereinafter also referred to as a “pigment ink”) has high image fastness as compared with an ink containing a dye (hereinafter also referred to as a “dye ink”). However, an image recorded using the pigment ink has low glossiness as compared with an image recorded using the dye ink.

As a technique for improving the glossiness of an image recorded using a pigment ink, Japanese Patent Laid-Open No. 2001-39006 discloses a technique for applying a clear ink containing a polymer emulsion to the image recorded using a pigment ink.

However, when the present inventors have examined the technique described in Japanese Patent Laid-Open No. 2001-39006, there was a case where sufficient glossiness was not obtained. Specifically, in an image recorded with an ink of a certain hue, high glossiness was obtained but, in an image recorded with an ink of another hue, high glossiness was not obtained. Therefore, the glossiness of the images recorded using inks of two or more different hues was not uniform.

SUMMARY OF THE INVENTION

Therefore, the invention provides an image recording method which gives uniform glossiness to an image recorded using inks of different hues.

The invention provides an image recording method including applying a first ink, a second ink, and a third ink to a recording medium by an ink jet method, and thereafter applying a clear ink to the recording medium, in which the first ink, the second ink, and the third ink each contain a pigment and have a different hue, the clear ink contains a water-soluble polymer, and the first ink, the second ink, and the third ink satisfy both the following relationships (1) and (2):

(1) the film thickness of dots of the inks formed when one drop of each ink is applied to the recording medium is as follows: First ink>Second ink>Third ink; and (2) the penetration time of the clear ink when applying the inks to the recording medium, and then further applying one drop of the clear ink to the region to which each ink is applied is as follows: First ink≥Second ink≥Third ink.

The invention can provide an image recording method which gives uniform glossiness to an image recorded using inks having different hues.

Further features of the present invention will become apparent from the following description of exemplary embodiments.

DESCRIPTION OF THE EMBODIMENTS

Image Recording Method

First, the circumstances where the invention has been accomplished are described. When the present inventors have examined, it has been found that when a pigment ink is applied, and thereafter a clear ink is applied in such a manner as to be at least partially superposed on a region to which the pigment ink is applied, the glossiness of an image is not uniform (hereinafter which is also referred to as “The gloss uniformity of an image decreases.”).

When the present inventors have further examined, it has been found that the reduction in the gloss uniformity of the image is caused by the generation of irregularities in the image to be obtained because the penetration speed of the applied clear ink varies depending on regions to which the pigment inks are applied. Specifically, there has been a case where the penetration speed of the clear ink in a region to which a pigment ink of a certain hue and the penetration speed of the clear ink in a region to which a pigment ink of a hue different from the hue of the pigment ink applied first are different from each other.

When the present inventors have further examined, it has been found that when an image of a secondary color is recorded by applying a pigment ink of a certain hue and a pigment ink of a different hue are applied to a recording medium in such a manner as to be adjacent to each other, and then a clear ink is applied thereon, irregularities are more notably generated in the image to be obtained.

As a result of further examining the above-described causes, the present inventors have found that the film thickness of the ink dot formed when one drop of the pigment ink is applied to a recording medium and the penetration time of the clear ink when one drop of the clear ink is applied to the region to which the pigment ink is applied have a very close relationship to irregularities of the image to be obtained. Hereinafter, the relationship of the film thickness of the pigment ink dot and the penetration time of the clear ink and the irregularities of the image to be obtained are described in more detail. In order to simplify the description, the pigment ink of a certain hue is referred to as an ink A and the pigment ink of a hue different from the hue of the ink A is referred to as an ink B.

When the penetration time of the clear ink when applying the clear ink to the region to which the ink A is applied is shorter than the penetration time of the clear ink when applying the clear ink to the region to which the ink B is applied, the clear ink preferentially flows to the region to which the ink A with a short penetration time is applied rather than the region to which the ink B with a long penetration time is applied, and then deposited. Therefore, the film thickness of the clear ink formed on the region where the ink A is applied is larger than the film thickness of the clear ink formed on the region where the ink B is applied. In this case, when the film thickness of a dot formed when one drop of the ink A is applied to a recording medium is larger than the film thickness of a dot of the ink B, the film thickness of the image in the region to which the ink A is applied (the total film thickness of the film thickness of the clear ink and the film thickness of the ink) becomes much larger than the film thickness of the image in the region to which the ink B is applied. As a result, irregularities of the image become remarkable in the regions to which the inks are applied, so that the glossy uniformity is impaired.

From the above-described examination results, the present inventors have found that when the film thickness of the dot formed when one drop of each ink is applied to a recording medium is as follows: Ink A>Ink B and the penetration time of the clear ink when applying one drop of the clear ink to the region to which each ink is applied is as follows: Ink A≥Ink B, the glossy uniformity is favorably maintained. As described above, the film thickness of the dot of the ink A is larger than the film thickness of the dot of the ink B. In contrast, the film thickness of the clear ink to be formed in the region where the penetration time of the clear ink is relatively short is larger than that in a region where the penetration time of the clear ink is relatively longer. Therefore, the film thickness of the clear ink on the region to which the ink A is applied becomes smaller than the film thickness of the clear ink on the region to which the ink B is applied. As a result, the film thickness of the image which is the total film thickness of the film thickness of each ink and the film thickness of the clear ink applied to the region to which each ink is applied is equalized between the ink A and the ink B, so that the glossiness of the image is equalized. In the invention, since at least three kinds of pigment inks different in the hue are used, the film thickness of the ink dots and the penetration time of the clear ink satisfy the above-described relationships among the three kinds of pigment inks. More specifically, the image recording method of the invention satisfies both the following (1) and (2):

(1) the film thickness of dots of the inks formed when one drop of each ink is applied to the recording medium is as follows: First ink>Second ink>Third ink; and (2) the penetration time of the clear ink when applying the inks to the recording medium, and thereafter further applying one drop of the clear ink to the region to which each ink is applied is as follows: First ink≥Second ink≥Third ink.

In the invention, it is suitable that the film thickness of the first ink dot is three times or lower than the film thickness of the second ink dot. Moreover, it is suitable that the film thickness of the second ink dot is three times or lower than the film thickness of the third ink dot.

The penetration time of the clear ink described in (2) above is suitably 5 msec or more and more suitably 10 msec or more. The upper limit is not particularly limited, and is suitably 80 msec or lower and more suitably 40 msec or lower. It is particularly suitable that the penetration time when applying one drop of the clear ink to the regions to which the first ink to the third ink are applied is in the ranges mentioned above.

A secondary color can be recorded by applying at least two kinds of inks among the first ink to the third ink in such a manner to be adjacent to each other or superposed on each other. In the invention, the ink is applied to a recording medium using an ink jet method. A method for applying the clear ink of the invention is not particularly limited insofar as the method can apply the same to the surface of a pigment ink recorded material. For example, a known method, such as a roll coater method, a bar coater method, a blade coater method, or a gravure coater method, can be used. Moreover, a non-contact method, such as a spray method or an ink jet method, can also be used. When the clear ink is applied by a roll coater method, a bar coater method, a blade coater method, a gravure coater method, or a spray method, it is suitable to apply the clear ink by these methods after recording an image with a pigment ink.

When the clear ink is applied by an ink jet method, it is suitable to determine the order of arranging recording heads of discharging the pigment inks and the clear ink in such a manner that the pigment ink is ejected first, and then the clear ink is ejected in order to apply the pigment inks to a recording medium, and then apply the clear ink to the recording medium. Moreover, it can also be controlled so that the clear ink is ejected to a unit region where the recording of an image with the pigment ink is completed. Furthermore, it may be configured so that the paper is ejected after recording a pigment ink image, the paper is fed again, and then the clear ink is applied to the surface of the pigment ink image.

In the ink jet recording method of the invention, it is particularly suitable to apply the clear ink to a recording medium by the ink jet method among the clear ink applying methods mentioned above. When the clear ink is applied by the ink jet method, the period of time from recording of an image to the application of the clear ink is short and a region to which the clear ink is applied can be appropriately controlled.

The film thickness of the dot formed when one drop of the pigment ink is applied to a recording medium is dependent on the solid content mainly contained in the ink. More specifically, the film thickness of the ink dot becomes larger when the amount of the pigment or the polymer contained in the ink is larger. In contrast, the penetration time of the clear ink to be applied to the region to which the ink is applied is dependent on the size of pores of a layer formed by the ink and the surface energy thereof. Therefore, in the invention, the film thickness of the dot can be controlled to a desired thickness by controlling the solid content in the ink and the size of pores formed by the ink and the surface energy can be desirably controlled, i.e., the penetration time of the clear ink can be controlled to a desired time, by adjusting the type and the amount of materials in the ink.

In the invention, a fourth ink or a fifth ink may be used which is different from the first ink to the third ink in the hue. Also when these inks are used, it is suitable to satisfy the above-described relationship such that the penetration time of the clear ink to be applied to the region to which the ink is applied is longer when the film thickness of the dot is larger. Hereinafter, materials which can be suitably used for the image recording method of the invention are described in detail.

Pigment Ink

Color Material

As described above, in the invention, at least three kinds of pigment inks which are different from each other in the hue are used. In the invention, it is suitable that the "three kinds of pigment inks which are different from each other in the hue" are three kinds of inks selected from a black ink, a cyan ink, a magenta ink, and a yellow ink. Furthermore, it is more suitable that the "three kinds of pigment inks which are different from each other in the hue" are a cyan ink, a magenta ink, and a yellow ink.

Pigments for use in these pigment inks are not particularly limited and known pigments can be suitably used. Specifically, mentioned as black pigments are Raven1060, Raven1080, Raven1170, Raven1200, Raven1250, Raven1255, Raven1500, Raven2000, Raven3500, Raven5250, Raven5750, Raven7000, Raven5000 ULTRAII, and Raven1190 ULTRAII (all manufactured by Colombian Carbon Co.), Black Pearls L, MOGUL-L, Regal400R, Regal660R, Regal330R, Monarch 800, Monarch 880, Monarch 900, Monarch 1000, Monarch 1300, and Monarch 1400 (all manufactured by Cabot Corp.), Color Black FW1, Color Black FW2, Color Black FW200, Color Black 18, Color Black 5160, Color Black 5170, Special Black 4, Special Black 4A, SpecialBlack 6, Printex35, PrintexU, Printex140U, PrintexV, and Printex140V (all manufactured by Degussa), No. 25, No. 33, No. 40, No. 47, No. 52, No. 900, No. 2300, No. 2600, MCF-88, MA600, MA7, MA8, and MA100 (all manufactured by Mitsubishi Chemical Corp.), and the like. Mentioned as color pigments are C.I. Pigment Yellow-12, 13, 14, 17, 20, 24, 55, 74, 83, 86, 93, 97, 98, 109, 110, 117, 120, 125, 128, 137, 138, 139, 147, 148, 150, 151, 153, 154, 155, 166, 168, 180, and 185, C.I. Pigment Orange-16, 36, 43, 51, 55, 59, 61, and 71, C.I. Pigment Red-9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255, and 272, C.I. Pigment Violet-19, 23, 29, 30, 37, 40, and 50, C.I. Pigment Blue-15, 15:1, 15:3, 15:4, 15:6, 22, 60, and 64, C.I. Pigment Green-7 and 36, C.I. Pigment Brown 23, 25, and 26 and the like.

Dispersant

In the invention, it is suitable to use a dispersant in order to disperse the pigment into water. The dispersant is not particularly limited and is suitably a copolymer of a hydrophobic monomer and a hydrophilic monomer. The copolymer may be a random copolymer, a block copolymer, or a graft copolymer and is suitably a random copolymer. Specifically mentioned as the copolymer are styrene-(meth)acrylic ester-(meth)acrylate copolymer, styrene-(meth)acrylate copolymer, styrene-styrene sulfonate copolymer, vinyl naphthalene-(meth)acrylic ester-(meth)acrylate copolymer, vinyl naphthalene-(meth)acrylate copolymer, (meth)acrylic ester-(meth)acrylate copolymer, (meth)acrylate polymer, alkenyl ether polymer, and the like. The styrene-acrylate copolymer is more suitable in terms of the dispersion stability and the manufacturing cost. In this description, one referred to as (meth)acrylic refer to methacryl or acryl.

The acid value of the copolymer is suitably 100 mgKOH/g or more and 200 mgKOH/g or lower. The acid value of the copolymer is more suitably 120 mgKOH/g or more and 180 mgKOH/g or lower. When the acid value is lower than 100 mgKOH/g, the ejection stability sometimes decreases.

The content of the copolymer is suitably 1.0% by mass or more and 20.0% by mass or lower based on the total mass of the inks. The content of the copolymer is more suitably 1.5% by mass or more and 10.0% by mass or lower. When the content is larger than 20.0% by mass, a reduction in the ejection stability due to an increase in the viscosity of the ink sometimes arises.

Aqueous Medium

It is suitable for the ink of the invention to contain an aqueous medium. Although only water may be used as the aqueous medium, it is suitable to use water and a water-soluble organic solvent. Specifically mentioned as the water-soluble organic solvent are alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, and n-pentanol; amides, such as dimethyl formamide and dimethyl acetamide; ketone or keto alcohols, such as acetone and diacetone alcohol; ethers, such as tetrahydrofuran and dioxane; oxyethylene or oxypropylene polymers, such as diethylene glycol, triethylene glycol, tetraethylene glycol, dipropyrene glycol, tripropylene glycol, polyethylene glycol, and polypropylene glycol; alkylene glycols in which the alkylene group contains 2 to 6 carbon atoms, such as ethylene glycol, propylene glycol, trimethylene glycol, 1,4-butanediol, 1,5-pentane diol, and 1,2-hexanediol; triols, such as 1,2,6-hexane triol, glycerin, and trimethylolpropane; lower alkyl ethers of glycols, such as ethylene glycol monomethyl (or ethyl)ether, diethylene glycol monomethyl (or ethyl)ether, and triethylene glycol monomethyl (or ethyl or butyl)ether; lower dialkyl ethers of polyvalent alcohols, such as triethylene glycol dimethyl (or ethyl)ether and tetraethylene glycol dimethyl (or ethyl)ether; alkanol amines, such as monoethanolamine, diethanolamine, and triethanolamine; sulfolane, N-methyl-2-pyrrolidone, 2-pyrrolidone, 1,3-dimethyl-2-imidazolidinone, urea, ethylene urea, bishydroxyethylsulphone, diglycerin, triglycerin, and the like. Among the water-soluble organic solvents mentioned above, ethylene glycol, 1,2-hexanediol, glycerin, diglycerin, polyethylene glycol, ethylene urea, and trimethylolpropane are suitable. The content of the water-soluble organic solvent is not particularly limited and is suitably 3% by mass or more and 60% by mass or lower and more suitably 5% by mass or more and 50% by mass based on the total mass of the inks. The content of water is suitably in the range of 50% or more and 95% or lower in terms of mass based on the total mass of the inks. It is a matter of course that a moisturizer may be added into the ink for use in the invention as required in addition to the above-mentioned components and that, in order to obtain an ink having desired physical property values, a surfactant, an antifoaming agent, an antiseptic, an antifungal agent, and the like may be added.

Clear Ink

The clear ink of the invention is a colorless ink. In the invention, the colorlessness means that the ratio of the maximum absorbance to the minimum absorbance (Maximum absorbance/Minimum absorbance) in the wavelength region of 400 nm to 800 nm which is the wavelength region of visible light is 1.0 or more and 2.0 or lower. This means that there is substantially no absorbance peak in the wavelength region of visible light, or even when there is the peak, the peak intensity is very small. It is suitable for the clear ink of the invention to contain no color materials in order to be colorless.

Water-Soluble Polymer

The clear ink of the invention contains a water-soluble polymer. The water-soluble polymer is not particularly limited. Specifically mentioned as the water-soluble polymer are styrene-(meth)acrylic ester-(meth)acrylate copolymer, styrene-(meth)acrylate copolymer, styrene-styrene sulfonate copolymer, vinyl naphthalene-(meth)acrylic ester-(meth) acrylate copolymer, vinyl naphthalene-(meth)acrylate copolymer, (meth)acrylic ester-(meth)acrylate copolymer, (meth)acrylate polymer, alkenyl ether polymer, and the like. The styrene-acrylate copolymer is more suitable in terms of the dispersion stability and the manufacturing cost. In this description, one referred to as (meth)acrylic refer to methacryl or acryl.

The acid value of the water-soluble polymer is suitably 100 mgKOH/g or more and 200 mgKOH/g or lower. The acid value of the water-soluble polymer is more suitably 120 mgKOH/g or more and 180 mgKOH/g or lower. When the acid value is lower than 100 mgKOH/g, the ejection stability sometimes decreases.

The content of the water-soluble polymer is suitably 1.0% by mass or more and 20.0% by mass or lower based on the total mass of the inks. The content of the water-soluble polymer is more suitably 1.5% by mass or more and 10.0% by mass or lower. When the content is larger than 20.0% by mass, a reduction in the ejection stability due to an increase in the viscosity of the clear ink sometimes arises.

Aqueous Medium

It is suitable for the clear ink of the invention to contain an aqueous medium. As the aqueous medium, any aqueous medium can be suitably used when it can be used for the above-described inks. It is suitable for the clear ink of the invention to contain at least one selected from an acetylene glycol surfactant and a polysiloxane surfactant. The acetylene glycol surfactant or the polysiloxane surfactant can improve the wettability to a target recording surface of a recording medium or the like to increase the penetration ability of the ink. Specifically mentioned as the acetylene glycol surfactant are 2,4,7,9-tetramethyl-5-decyne-4,7-diol, 3,6-dimethyl-4-octyne-3,6-diol, 3,5-dimethyl-1-hexyne-3-ol, 2,4-dimethyl-5-hexyne-3-ol, and the like. Moreover, as the acetylene glycol surfactant, commercially available products can also be utilized and, for example, Olfine E1010, STG, and Y (all manufactured by Nissin Chemical Industry Co., Ltd.), Surfinol 104, 82, 465, and 485 and TG (all manufactured by Air Products and Chemicals, Inc.) are mentioned.

EXAMPLES

Hereinafter, the invention is described in more detail with reference to examples and comparative examples but is not limited thereto. In the following description, "part" and "%" are based on mass unless otherwise specified.

Preparation of yellow ink

A 500 mL eggplant flask having a mechanical stirrer was placed in a bath of an ultrasonic generator. Then, 2.5 g of vinyl polymer (styrene-acrylate random copolymer (acid value of 140 mg/KOHg)) and 120 mL of tetrahydrofuran were added into the flask, and then sufficiently stirred while applying an ultrasonic wave. 5 g of C.I. Pigment Yellow 74 was placed in another container, 120 mL of tetrahydrofuran was added thereto, and then they were mixed with a stirrer (manufactured by Kurabo Industries Ltd.) until the pigment surface sufficiently got wet with the solvent. Thereafter, the mixture was added into the 500 ml eggplant flask, and sufficiently mixed with the vinyl polymer.

Next, the phase was inverted by adding dropwise an aqueous alkaline solution containing KOH which merely achieves a neutralization ratio of the vinyl polymer of 100%, premixing was performed for 60 minutes, and then dispersion was performed for 2 hours using a nanomizer NM2-L200AR (manufactured by Yoshida Kikai Co., Ltd.). The tetrahydrofuran was distilled off from the dispersion liquid using a rotary evaporator, and then the concentration was adjusted to thereby obtain a yellow pigment dispersion liquid with a pigment concentration of 6%. Next, an ink preparation liquid having the composition shown below was prepared in such a manner as to give a total amount of 100 parts.

| | |
|---|---|
| Yellow pigment dispersion liquid | 50 parts |
| Glycerin | 10 parts |
| Diethylene glycol | 5 parts |
| Acetylene glycol surfactant (trade name: Acetylenol EH, manufactured by Kawaken Fine Chemicals Co., Ltd.) | 1 part |
| Ion exchange water | Balance |

The pH of the ink preparation liquid thus obtained was adjusted to 9.5 with KOH, and then made to pass through a glass filter AP20 (manufactured by Millipore), thereby obtaining a yellow ink.

Preparation of cyan ink

The same operation as the operation of the preparation of the yellow ink was performed, except changing the C.I. Pigment Yellow 74 used for the preparation of the yellow pigment dispersion liquid to Pigment Blue-15:3, thereby obtaining a cyan pigment dispersion liquid and a cyan ink.

Preparation of Magenta Ink 1

The same operation as the operation of the preparation of the yellow ink was performed, except changing the C.I. Pigment Yellow 74 used for the preparation of the yellow pigment dispersion liquid to C.I. Pigment Red-122, thereby obtaining a magenta pigment dispersion liquid and a magenta ink 1.

Preparation of the Magenta Ink 2

The magenta ink 1 and ion exchange water were mixed in such a manner that the mass ratio was 1:1, thereby obtaining a magenta ink 2.

Preparation of the Magenta Ink 3

The magenta ink 1 and a styrene-acrylate random copolymer having an acid value of 170 mg/KOHg were mixed in such a manner that the mass ratio was 98:2, thereby obtaining a magenta ink 3.

Preparation of Clear Ink

The following components were placed in a container in such a manner as to give a total amount of 100 parts, and sufficiently mixed and stirred in the container. Thereafter, the pH of the mixture was adjusted to 9.5 with KOH, and the mixture was made to pass through a glass filter AP20 (manufactured by Millipore), thereby producing a clear ink.

| | |
|---|---|
| Styrene-acrylate random copolymer (Acid value of 170 mg/KOHg) | 2.5 parts |
| Glycerin | 7.5 parts |
| Acetylene glycol surfactant (trade name: Acetylenol EH, manufactured by Kawaken Fine Chemicals Co., Ltd.) | 1 part |
| Ion exchange water | Balance |

Measurement of Film Thickness of Ink Dot

The pigment inks were applied onto a premium glossy paper (manufactured by CANON KABUSHIKI KAISHA) with a single dot using an ink jet printer (F900, manufactured by CANON KABUSHIKI KAISHA), and then the shape was measured using an atomic force microscope (AFM) to thereby determine the film thickness of the ink dots. The used AFM is a nanoscale hybrid microscope VN-8000 manufactured by KEYENCE CORPORATION. The film thickness of the dot formed when applying one ink drop was calculated by measuring a 180 μm square region. The results are shown in Table 1.

Penetration Time of Clear Ink

The yellow ink, the cyan ink, and the magenta inks 1 to 3 described above each were applied onto a recording medium with 100% duty at 1200 dpi, and thereafter one drop of the clear ink was applied onto an image recorded with each ink. The process after applying the clear ink to the permeation thereof was recorded with a high speed camera. By measuring the period until the one drop of the clear ink penetrated and the surface became smooth, the penetration time of the clear ink when applying one drop of the clear ink to the region to which the ink was applied was calculated. Herein, the "smooth" indicates a state where the surface of the liquid droplet was in the same pixel (1 pixel: 0.875 μm) to the medium surface of an image taken with a high speed camera. The "duty" is a value calculated from the equation of Duty (%)=Actually printed dot number/(Vertical pixel number×Horizontal pixel number)×100. In the invention, the "Actually printed dot number" is the actually printed dot number per unit region. The "Vertical pixel number" and the "Horizontal pixel number" are the vertical pixel number and the horizontal pixel number per unit region, respectively. The results are shown in Table 1.

TABLE 1

| | Film thickness of ink dot (nm) | Penetration time of clear ink (msec) |
|---|---|---|
| Yellow ink | 399 | 20 |
| Cyan ink | 320 | 12 |
| Magenta ink 1 | 453 | 15 |
| Magenta ink 2 | 215 | 10 |
| Magenta ink 3 | 476 | 20 |

Method for Producing Printed Material

An ink jet printer (iPF5100, manufactured by CANON KABUSHIKI KAISHA) was used as an ink jet recording device. With respect to the resolution when recording, the resolution in the sub-scanning direction was set to 1200 dpi (dot/inch) and the resolution in the main scanning direction was set to 2400 dpi. The ink amount ejected from one nozzle by one ejection operation is 4.8 pl. On a premium glossy paper (manufactured by CANON KABUSHIKI KAISHA), the cyan ink, the yellow ink, and the magenta inks 1 to 3 were used for recording a red color of a mixture of colors (magenta+yellow) and a blue color of a mixture of colors (magenta+cyan) with 120% duty with 8 paths (the ink of each hue was applied with a 60% duty cycle). An image was recorded with the inks, the paper was ejected, the paper was fed again, and then the image was entirely overcoated with the clear ink with one path with a 50% duty.

Evaluation of Gloss Uniformity

The gloss uniformity of the image obtained by the method for producing a printed material described above was evaluated. For the evaluation of gloss uniformity, a DIAS DOI Image Analysis System manufactured by QEA was used and the measured Sharpness value was defined as the image clarity value. The Sharpness value was defined as follows. A white LED was used as a light source, and a knife edge is located between the light source and a measurement sample. Then, the reflected image of the knife edge reflected on the sample is taken with a CCD camera (300000 pixels: 5 μm per pixel). The pixel visual field is a 2.4 mm square region. The luminance distribution of the knife edge portion of the reflected image is primarily differentiated, and the inverse number of the half width is defined as the Sharpness value. Therefore, when the Sharpness value is higher, a sharp reflected image is obtained, which means that the image clarity is high. When the image has a sharpness value equal to or higher than a certain value, the image was an image in which the glossiness was equalized to the human eye even when there is a difference in the numerical values of the sharpness among the recorded colors. Therefore, in the invention, it is considered that when the sharpness of the image after applying the clear ink is 2.00 or more, the image has excellent gloss uniformity. The results are shown in Table 2.

Moreover, the gloss uniformity was also evaluated by visual observation. The evaluation criteria for visual evaluation are as follows. The results are shown in Table 2.

○: The gloss of the image after applying the clear ink became uniform as compared with the gloss of the image before applying the clear ink.

x: The gloss of the image after applying the clear ink did not change or decreased as compared with the gloss of the image before applying the clear ink.

TABLE 2

| | Ex. 1 | | Ex. 2 | | Comp. Ex. 1 | | |
|---|---|---|---|---|---|---|---|
| Color ink | Magenta ink 2<br>Cyan ink<br>Yellow ink | | Magenta ink 3<br>Cyan ink<br>Yellow ink | | Magenta ink 1<br>Cyan ink<br>Yellow ink | | |
| Formed secondary color | Blue | Red | Blue | Red | Blue | Green | Red |
| Sharpness before applying clear ink | 1.40 | 1.07 | 1.03 | 1.22 | 1.00 | 1.07 | 1.31 |
| Sharpness after applying clear ink | 4.22 | 2.23 | 3.49 | 2.83 | 2.36 | 4.30 | 1.36 |
| Difference in sharpness before and after applying clear ink | 2.82 | 1.16 | 2.46 | 1.61 | 1.36 | 3.23 | 0.05 |
| Evaluation of gloss uniformity by visual observation | ○ | ○ | ○ | ○ | ○ | ○ | X |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-129159 filed Jun. 9, 2011, which is hereby incorporated by reference herein in its entirety.

What is claimed is:

1. An image recording method, comprising:

applying a first ink, a second ink, and a third ink to a recording medium by an ink jet method, and thereafter applying a clear ink to the recording medium, the first ink, the second ink, and the third ink each containing a pigment and having a different hue, the clear ink containing a water-soluble polymer, and the first ink, the second ink, and the third ink satisfying both the following relationships (1) and (2):

(1) the film thickness of dots of the inks formed when one drop of each ink is applied to the recording medium being as follows: First ink>Second ink>Third ink; and (2) the penetration time of the clear ink when applying the inks to the recording medium, and then further applying one drop of the clear ink to the region to which each ink is applied being as follows: First ink≥Second ink≥Third ink.

2. The image recording method according to claim 1, wherein at least two kinds of inks among the first ink, the second ink, and the third ink are applied to the recording medium in such a manner as to be adjacent to each other or superposed on each other.

* * * * *